US008061236B2

(12) United States Patent
French

(10) Patent No.: US 8,061,236 B2
(45) Date of Patent: Nov. 22, 2011

(54) BICYCLE PEDAL

(75) Inventor: George French, Sheffield (GB)

(73) Assignee: Bear Corporation, Cerritos, CA (US)

( * ) Notice: Subject to any disclaimer, the term of this patent is extended or adjusted under 35 U.S.C. 154(b) by 1097 days.

(21) Appl. No.: 11/903,091

(22) Filed: Sep. 20, 2007

(65) Prior Publication Data

US 2009/0078081 A1     Mar. 26, 2009

(51) Int. Cl.
*B62M 3/00* (2006.01)
(52) U.S. Cl. ....................................................... 74/594.4
(58) Field of Classification Search ................ 74/594.4, 74/594.6; 411/388, 458, 399; 446/93, 94, 446/95; D8/387
See application file for complete search history.

(56) References Cited

U.S. PATENT DOCUMENTS

| | | | | |
|---|---|---|---|---|
| 323,162 A * | 7/1885 | Latta | | 74/594.4 |
| 543,806 A * | 7/1895 | Graham | | 74/594.4 |
| 563,959 A * | 7/1896 | Grothe | | 74/594.4 |
| 579,479 A * | 3/1897 | Goebler | | 74/594.4 |
| 599,619 A * | 2/1898 | Matthews | | 74/594.6 |
| 623,399 A * | 4/1899 | Germaine | | 74/594.4 |
| 1,567,775 A * | 12/1925 | Wagner | | 74/594.4 |
| 1,782,973 A * | 11/1930 | Persons | | 74/594.4 |
| 2,391,232 A * | 12/1945 | Farrell et al. | | 411/244 |
| 2,751,797 A * | 6/1956 | Pearl | | 74/594.4 |
| 3,320,826 A * | 5/1967 | Morse | | 74/594.4 |
| 3,382,734 A * | 5/1968 | Hussey | | 74/594.4 |
| 3,798,997 A | 3/1974 | Konzorr | | |
| 3,811,339 A * | 5/1974 | Konzorr | | 74/594.4 |
| 4,189,976 A * | 2/1980 | Becker | | 411/396 |
| 4,488,453 A * | 12/1984 | Drugeon et al. | | 74/594.6 |
| 4,622,863 A * | 11/1986 | Denker | | 74/594.6 |
| 4,690,420 A * | 9/1987 | Belka | | 280/304.1 |
| 4,864,887 A | 9/1989 | Rapisarda | | |
| 4,873,890 A * | 10/1989 | Nagano | | 74/594.4 |
| 4,882,946 A * | 11/1989 | Beyl | | 74/594.6 |
| 5,003,841 A * | 4/1991 | Nagano | | 74/594.4 |
| 5,379,665 A * | 1/1995 | Nagano | | 74/594.4 |
| 5,398,570 A * | 3/1995 | Chae | | 74/563 |
| 5,449,332 A | 9/1995 | Hervig | | |
| 5,606,894 A * | 3/1997 | Bryne | | 74/594.6 |
| 5,778,739 A * | 7/1998 | Takahama | | 74/594.6 |
| 5,787,764 A * | 8/1998 | Peyre | | 74/594.6 |

(Continued)

OTHER PUBLICATIONS http://web.archive.org/web/20060326185243/www.ikea.com/webapp/wcs/stores/serylet/ProductDisplay?topcategoryId=15561&catalogId=10103&storeId=12&productId=15290&langId=-1&parentCats=15561*15639*15643.*

(Continued)

*Primary Examiner* — Justin Krause
*Assistant Examiner* — Adam D Rogers
(74) *Attorney, Agent, or Firm* — Cislo & Thomas, LLP

(57) ABSTRACT

A bicycle pedal apparatus is provided formed from two identical halves comprising a plurality of holes. A bolt secures the two halves through the holes and projects out beyond the surface of the pedal, thereby performing a dual role of securing the two halves together and serving as a traction mechanism. The pedal bodies rotate about a pedal axle either directly on the axle or on bearings. In embodiments utilizing bearings, two different bearings are used, roller bearings to bear the rotational load and thrust bearings to bear any axial load. The pedal axle can be tapered with a flanged head and resides in a cavity in the pedal body that substantially conforms to the shape of the pedal axle so as to minimize movement of the pedal axle within the pedal body.

10 Claims, 5 Drawing Sheets

U.S. PATENT DOCUMENTS

| | | | |
|---|---|---|---|
| 5,806,379 A | 9/1998 | Nagano | |
| 5,931,053 A * | 8/1999 | Chen | 74/594.6 |
| 6,050,154 A * | 4/2000 | Fan | 74/594.4 |
| 6,085,614 A * | 7/2000 | Lin | 74/594.6 |
| 6,205,885 B1 * | 3/2001 | Hermansen et al. | 74/594.6 |
| 6,227,071 B1 * | 5/2001 | Coombe | 74/594.4 |
| 6,227,072 B1 * | 5/2001 | Ritchey et al. | 74/594.6 |
| 6,282,984 B1 * | 9/2001 | Chen | 74/594.6 |
| 6,647,826 B2 * | 11/2003 | Okajima et al. | 74/594.4 |
| 6,851,189 B2 * | 2/2005 | Hermansen et al. | 29/897.2 |
| 7,013,754 B2 | 3/2006 | Milanowski | |
| 7,526,982 B2 * | 5/2009 | Chen | 74/594.6 |
| 7,669,504 B2 * | 3/2010 | Lin | 74/594.4 |
| 2002/0100343 A1 * | 8/2002 | Okajima et al. | 74/594.4 |
| 2002/0170382 A1 * | 11/2002 | Yang | 74/594.6 |
| 2003/0029270 A1 * | 2/2003 | Milanowski | 74/594.4 |
| 2005/0028639 A1 * | 2/2005 | Chang | 74/594.4 |
| 2005/0116438 A1 * | 6/2005 | Wang et al. | 280/210 |
| 2006/0266154 A1 * | 11/2006 | Hermansen et al. | 74/594.4 |
| 2006/0291980 A1 * | 12/2006 | Hofschneider | 411/399 |
| 2008/0250896 A1 * | 10/2008 | Lin | 74/594.4 |
| 2008/0295642 A1 * | 12/2008 | Liou | 74/594.5 |
| 2009/0158888 A1 * | 6/2009 | Coderre | 74/594.4 |

OTHER PUBLICATIONS

Site where Ikea Leksvik instructions are located: http://www.ikea.com/ms/en_US/customer_service/assembly_instructions.html.*

* cited by examiner

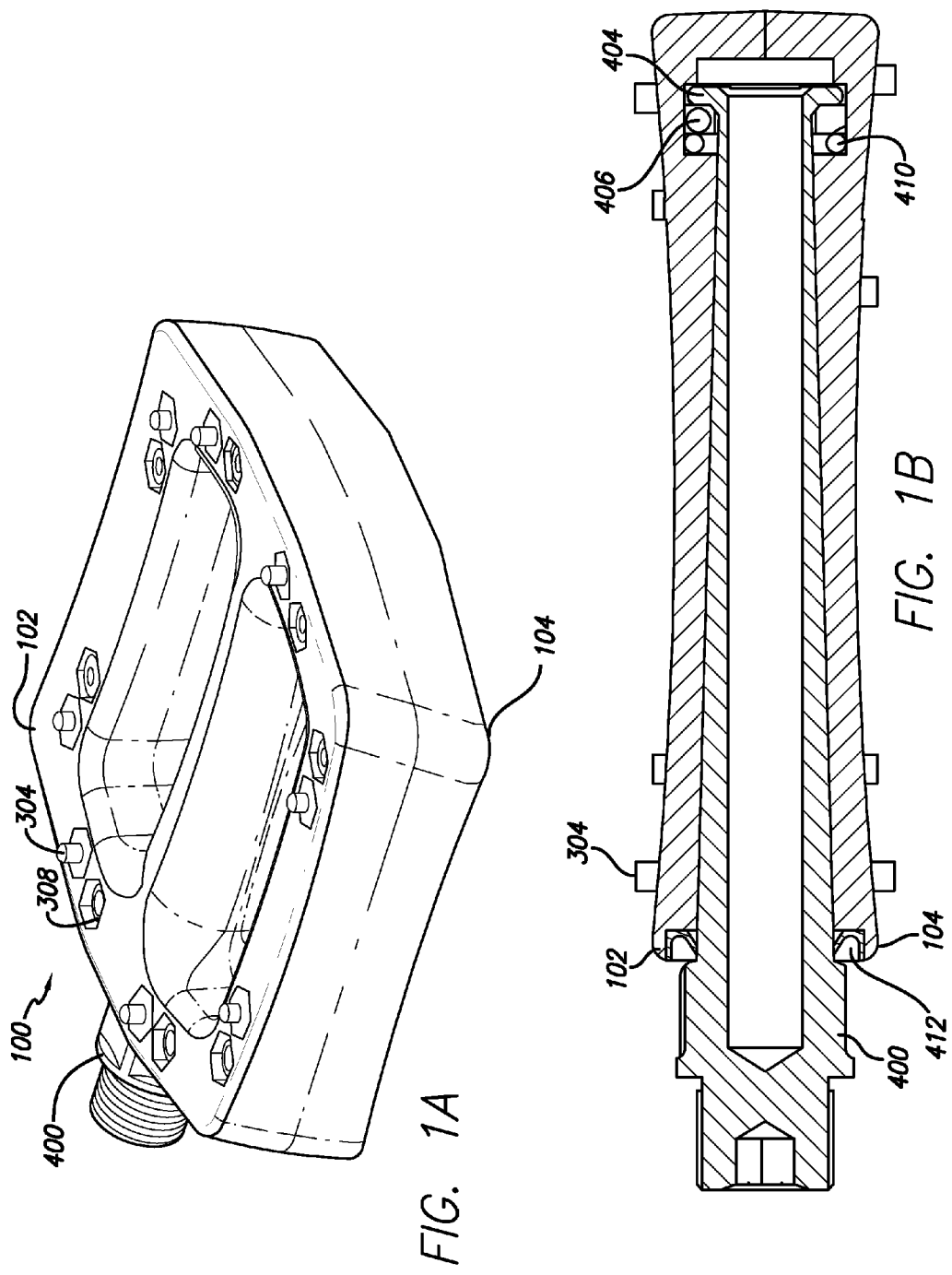

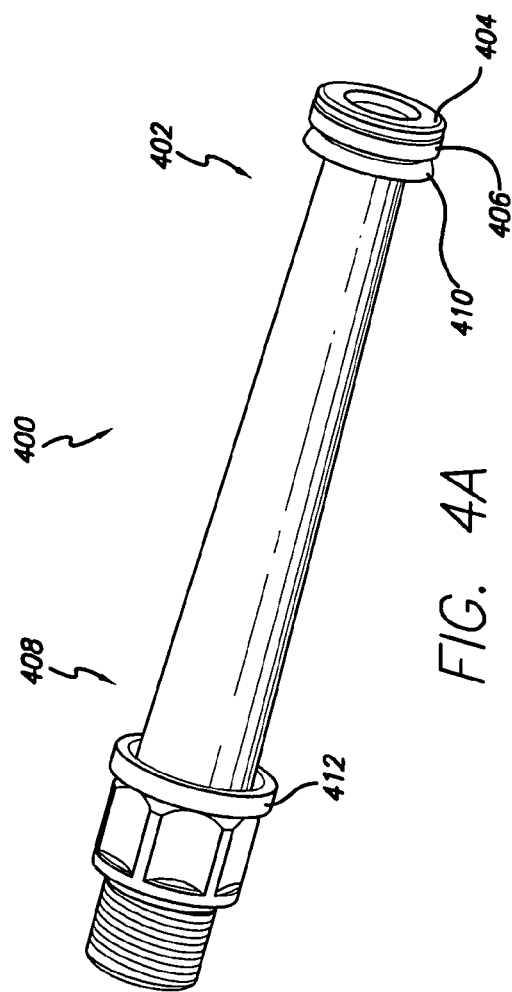
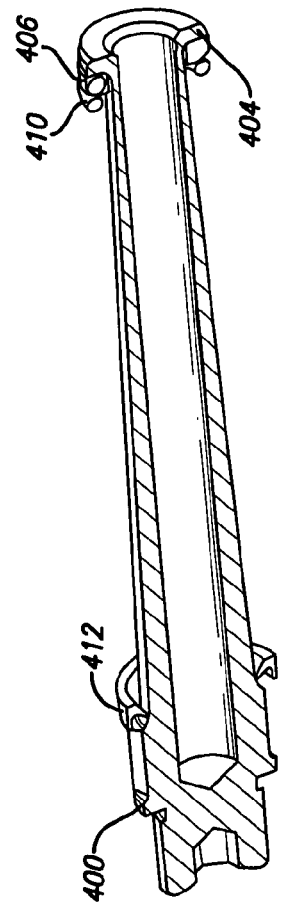
FIG. 4A
FIG. 4B

BICYCLE PEDAL

TECHNICAL FIELD

This invention relates to bicycle parts, particularly, bicycle pedals.

BACKGROUND ART

Current bicycle pedal designs are generally comprised of a die-cast body that is formed in one-piece from aluminum or magnesium alloys. Due to bearing placement requirements, the strength and weight reduction of these die-castings tends to be complex and in many cases they require expensive tooling. Additionally, they may also require extensive secondary machining work. Some pedals have been made using plastic bodies, but these also tend to require a complex mold since they generally rely on traditional body design shapes. Plastic pedals are also usually considered to be too slippery. This is generally due to the pedal's molded-plastic shoe pins that tend to provide an inferior grip when compared to the steel pins found in metal pedals. The steel pins in metal pedals, however, normally utilize fixing points that tend to be vulnerable to damage. This damage usually prevents the fitting of a replacement pin that could be used to prolong the life of the pedal.

Traditional pedals also use either "loose" ball bearing arrangements or "sealed" ball bearing arrangements. Sealed bearing pedal arrangements are generally a combination of simple bushings, needle roller bearings and small, deep-groove radial cartridge bearings. In the case of loose ball bearings, the performance is inconsistent, and they rely on regular maintenance and adjustment in order to function properly. Furthermore, in order to minimize the thickness of the body, which is a desirable feature, the diameter of the spindle is restricted by the ball bearing size, and this in turn compromises strength. With "sealed" bearing designs, the standard deep groove bearings are either too large or too weak to handle the loads imposed on the pedal design. Additionally, the use of a bushing-type bearing in this area provides for a less than ideal performance, and axial loads (such as those from dropping the bicycle sideways) can easily destroy the single deep groove cartridge bearing. Many existing pedal designs also require an access port at the outboard end of the pedal body for assembly purposes. This access area is usually capped, but the cover employed is often vulnerable to damage, either making it hard to remove or causing it to either break or fall out, allowing dirt into the bearing cavity.

Thus, there is a need for a bicycle pedal that separates the function of radial and axial location bearings to enhance the strength, performance, and durability. In addition, the construction of the bicycle pedal needs to be simplified and allow for the use of composite materials with steel gripping pins for easy replacement. Also, eliminating the access port would minimize damages and production costs.

SUMMARY OF INVENTION

This patent is directed towards a bicycle pedal that separates the function of radial and axial location bearings to enhance strength, performance, and durability. The construction is simplified and allows for the use of composite materials with steel gripping pins. The gripping pins can be easily replaced and since they are supported through the full thickness of the body, they are less likely to cause damage to the pedal body when impacted. The improved construction eliminates the need for an assembly access port at the outboard end of the pedal body.

These improved features arise from a split body configuration with two halves of the bicycle pedal mated at their inner faces and secured together with a number of nuts and bolts. Each pedal body constitutes two halves that are identical in shape and form. This design allows a single shape to be used to produce both halves. Construction costs are saved by the fact that only a single type of pedal body needs to be created.

The bolts may be sized so that some excess length protrudes beyond the nut and the surface of the pedal bodies, thereby creating a gripping pin to provide traction to the rider's shoe. The length of the bolts can be chosen by the user to provide varying levels of traction to meet the rider's specific needs.

A pedal axle comprising an outboard end and an inboard end can be tapered and can have a flanged head at the outboard end. The tapered pedal axle with a flanged head minimizes any type of radial or axial movement. In addition, two types of bearings can be utilized, roller bearings, such as needle bearings; and thrust bearings, such as bushings or cartridge ball bearings, to further minimize radial and axial movement and facilitate rotational movement of the pedal bodies about the pedal axle.

These and other aspects of the invention will become apparent from a review of the accompanying drawings and the following detailed description of the invention.

BRIEF DESCRIPTION OF DRAWINGS

FIG. 1A is a perspective view of a fully assembled embodiment of the present invention;

FIG. 1B is a cross-sectional side view of an embodiment of the present invention;

FIG. 4A is a perspective view of an embodiment of a pedal axle;

FIG. 4B is a cross-sectional view of the pedal body in FIG. 4A;

BEST MODE FOR CARRYING OUT THE INVENTION

Figure 2A:
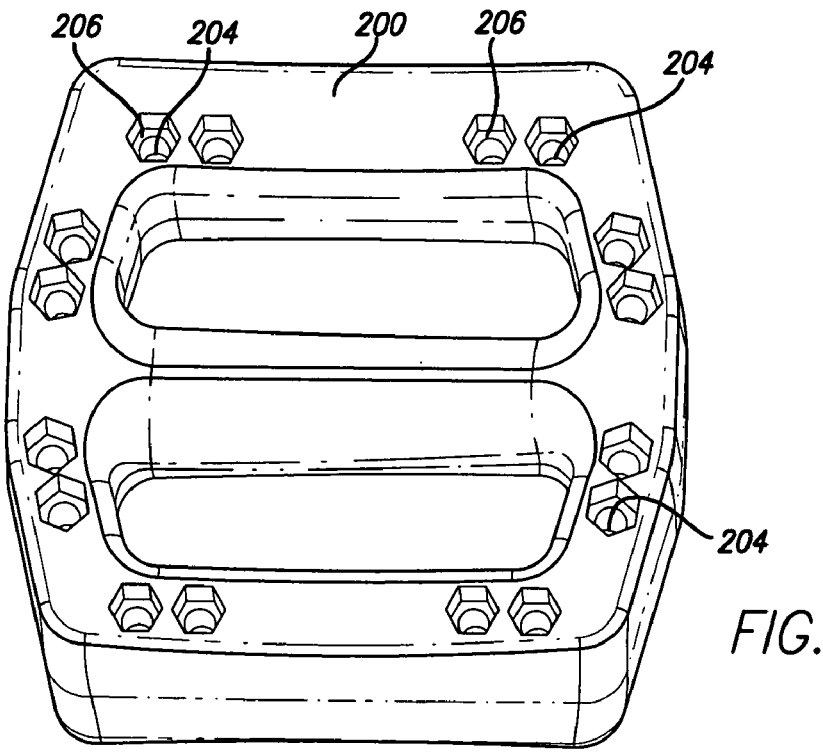
FIG. 2A is another perspective view of an embodiment of the present invention.
Figure 2B:
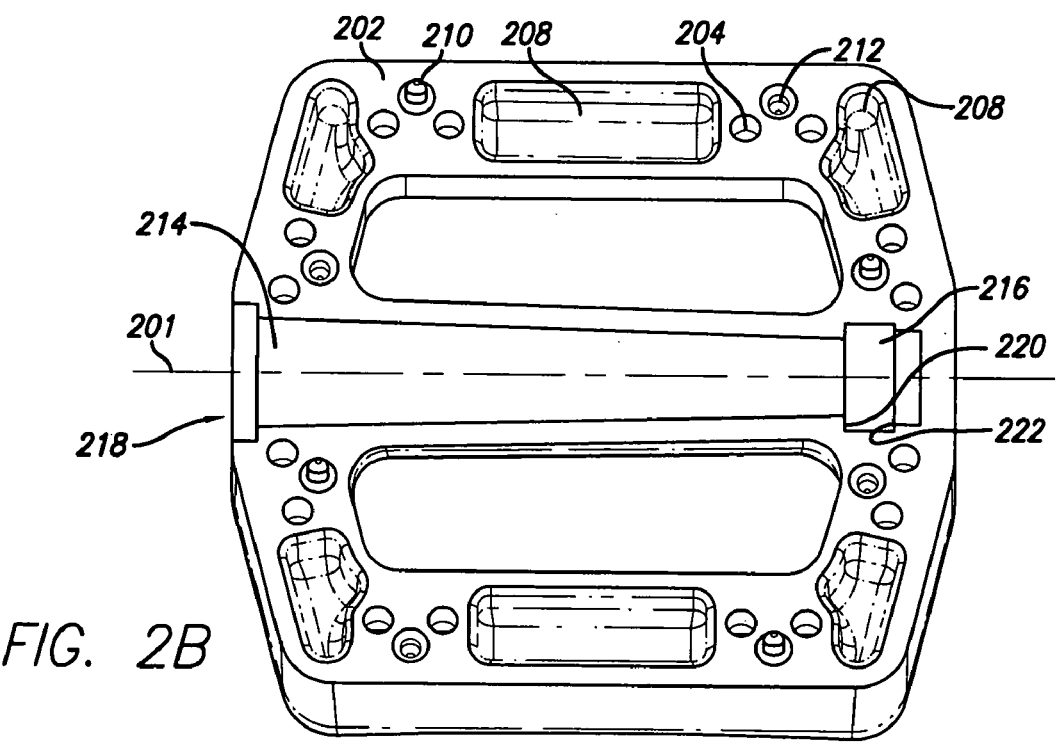
FIG. 2B is a top view of an inner surface of a pedal body without the axle shown.

The detailed description set forth below in connection with the appended drawings is intended as a description of illustrated exemplary embodiments and is not intended to represent the only forms in which these embodiments may be constructed and/or utilized. The description sets forth the functions and sequence of steps for constructing and operating the present invention in connection with the illustrated embodiments. However, it is to be understood that the same or equivalent functions and/or sequences may be accomplished by different embodiments that are also intended to be encompassed within the spirit and scope of the present invention.

The present invention is an improved bicycle pedal 100 formed by mating two pedal bodies 102, 104 that are fastened together about a pedal axle 400 with nuts 300 and bolts 302 such that the tail 304 of the bolts 302 that fasten the pedal bodies 102, 104 together serve as traction pins by protruding out and above the outer surface 200 of the pedal bodies 102, 104. Shoe "pins" are commonly employed on metal pedals, but frequently become damaged, making them difficult to replace. By forming the pins from the tail 304 of the threaded ends of bolts 302, which are removable, and by securing the pins with threaded nuts 300, which are also removable, replacement of the hardware after damage becomes quite simple. In another embodiment, the pedal axle 400 may be tapered toward the outboard end 402 and comprise a flanged head 404. The tapered outboard end 402 may be fitted with a bushing and the inboard end 408 of the pedal axle 400 may be fitted with a lip seal 412.

To save on costs and simplify construction, the bicycle pedal 100 may be assembled from two identical pedal bodies 102, 104 mated together. As such, the pedal bodies 102, 104 are assembled about the central axis of the axle 400. In this configuration, the inner surfaces 202 of the two identical pedal bodies, contain a left-right assembly relationship, when aligned. The identical halves 102, 104 feature locating pegs 210 that align with locating apertures 212 when the bodies are mated together to form an assembled pedal body.

The pedal bodies 102, 104 comprise an outer surface 200 and an inner surface 202. The bicycle pedal 100 is assembled from two pedal bodies 102, 104 mated at the inner surface 202. In one embodiment the pedal bodies 102, 104 comprise a hole 204, and preferably, a plurality of holes 204 that extend from the outer surface 200 to the inner surface 202. The holes 204 receive bolts 302 or other types of elongated fastening apparatus. The hole 204 can be smooth or threaded. A smooth hole 204 would make replacing the bolt 302 quicker and easier as time would not be spent unscrewing the bolt 302 from the entire thickness of two pedal bodies 102, 104. In addition, in some embodiments, the user can easily control the amount of rotational drag that the body has on the spindle by adjusting the tightness of the bolts 302. The threadless holes also allow the body to more readily compress or decompress under a given load of the nut/bolt torque.

The diameter of the hole 204 is substantially the same size as the diameter of the shaft 306 of the bolt 302 but smaller than the head 308 of the bolt 302 so that the bolt 302 can fit in the hole 204 without falling through. The length of the bolt 302 is greater than the thickness of two pedal bodies 102, 104. The pedal bodies 102, 104 are designed such that when the inner surface 202 of two pedal bodies 102, 104 are mated every hole 204 in the first pedal body 102 aligns with every hole 204 in the second pedal body 104. With this configuration, a bolt 302 inserted through a hole 204 in the first pedal body 102 will protrude out and beyond the outer surface 200 of the second pedal body 104.

When the bolt 302 is secured with a nut 300, the protruding bolt 302 serves as a traction mechanism to catch the shoe of a rider and create resistance. The length of the bolt 302 should be greater than the thickness of two pedal bodies 102, 104 mated together so that the tail 304 of the bolt 302 protrudes out from the outer surface 200 of the pedal body 102. The rider can select the desired length based on his or her preferences. Each bolt 302 can also be of a different length as different parts of the rider's shoe may require traction to a different extent.

Due to the pedal bodies 102, 104 being identical, bolts 302 can be inserted through the first pedal body 102 and out the second pedal body 104 as well as being inserted through the second pedal body 104 and protruding out of the first pedal body 102. This will provide protrusions from both sides of the bicycle pedal 100. The number of holes 204 and the placement of the holes 204 can be strategically designed so as to maximize traction in the most efficient manner. In addition, due to the multi-purpose nature of the holes 204 when two pedal bodies 102, 104 are mated together, more freedom is provided for users to adjust the arrangement of the bolts 302 to their personal tastes. In other words, each recess 206 can house either the head of the bolt 308, or a captive nut 300, allowing for a wider range of choices when positioning the desired arrangement of gripping pins.

Since the bolts 302 are used as traction pins, replacement of any damaged traction pins is cost-effective and easy since bolts 302 are relatively inexpensive and the traction pins can be replaced individually. In addition, damage to the bolts 302 would cause less damage to the pedal bodies 102, 104 than prior versions as the structural advantage of this bolt configuration would spread the impact loads throughout the pedal body.

In some embodiments, the outer surface 200 comprises a recess 206 and preferably, a plurality of recesses 206. Preferably, the recesses 206 are hexagonal to conform to the currently existing hexagonal nuts. The hexagonal recess 206 has a diameter that is greater than the hole 204 and is positioned to lead into the hole 204. The diameter of the hexagonal recess 206 should also be substantially similar to the diameter of a hexagonal nut 306. In addition, the depth of the hexagonal recess 206 should be substantially the same as or greater than the thickness of the hexagonal nut 300 and the thickness of the bolt head 308. The diameter of the bolt head 308, however, should be substantially similar to or smaller than the diameter of the hexagonal recess 206. This configuration will allow the bolt head 308 and the hexagonal nut 300 to be flush with the outer surface 200 or below the outer surface 200. In addition, when the hexagonal nut is lodged in the hexagonal recess, the hexagonal nut will not be able to rotate. On the other hand, when the bolt is placed in the hexagonal recess the bolt will be allowed to rotate. Therefore, two pedal bodies 102, 104 can be fastened by inserting a bolt 302 through a hexagonal recess 206 and corresponding hole 204 of a first pedal body 102 and securing the bolt 302 with a hexagonal nut 300 on the outer surface 200 of the second pedal body 104 by tightening the bolt 302. The nut 300 and recess 206 have been described as hexagonal because nuts are conventionally hexagonal. However, it is to be understood that any type and shape of removable nuts and recesses of accommodating shape may be used without departing from the scope of this invention. For example, a wing nut could be used. The wing nut would add additional points for traction and has the benefit of being removable without any tools. In such an embodiment the recesses 206 may not be required.

Although the traction mechanism have been described as a bolt 302 and nut 300 configuration, the traction mechanism may be formed by other types of fastening mechanisms. For example, a bolt and nut, the bolt can have a hole at the tail parallel to the outer surface 200 through which a cotter pin could be inserted. Using a spring type cotter pin would allow for even quicker replacement of the bolt since unscrewing would not be necessary. In fact, in such a case a bolt would not be required but rather a simple lug or rivet with a flanged head. In embodiments with flat head, a recess may not be necessary.

In certain embodiments, the pedal bodies 102, 104 further comprise a void 208 to minimize the weight and production cost of the pedal bodies 102, 104. Production costs and weight can be saved because less material is used. Using less material results in decreased molding cycle time and a lighter pedal body. The void 208 may be a cavity on the inner surface 202 of the pedal bodies 102, 104, a cavity on the outer surface 200 of the pedal bodies 102, 104, a hole through the entire pedal body, or any combination thereof. The void 208 can be any shape and size.

The inner surface 202 further may further comprise a locating peg 210 and a locating aperture 212. The locating peg 210 and locating aperture 212 may be positioned as corresponding counterpart interfaces about the central axis 201. This configuration will allow two identical pedal bodies 102, 104 to mate at their inner surfaces 202 and have the locating peg 210 of the first pedal body 102 inserted into the locating aperture 212 of the second pedal body 104 and vice versa. In addition, the locating peg 210 and locating aperture 212 should be positioned such than when the locating peg 210 of a first pedal body 102 is inserted into the locating aperture 212 of a second pedal body 104 and vice versa, all edges of the inner surfaces 202 of the pedal bodies 102, 104 are generally in alignment, including the edges of any holes 204.

The inner pedal bodies 102, 104 may further interface with a static seal 310 compressed between the first pedal body 102 and the second pedal body 104. The static seal 310 helps prevent grease from leaking out of the bicycle pedal 100 and helps keep dirt and debris out of the bicycle pedal 100. The pedal bodies 102, 104 may further comprise a groove outlining the shape of the static seal 310 so that the static seal 310 can be fitted into the pedal bodies 102, 104. The static seal 310 is preferred in embodiments where the pedal bodies 102, 104 are constructed from plastic or a composite. The natural compressibility of the static seal 310 serves as a fine-tuning element that assists in controlling the amount of drag between the bearing surface of the pedal body's axle cavity 214 and the pedal axle 400. The drag increases incrementally as the pedal's bolts 302 are tightened.

The pedal bodies 102, 104 may be constructed by using any manufacturing technique, such as injection molding, forging, casting, die-casting, tooling, machining and the like. As such, the pedal bodies 102, 104 can be made of any sturdy material such as any type of metal, plastic, or composite material.

The pedal axle 400 may be aligned with the central axis 201 of the pedal bodies 102, 104 and provide the structural support for the pedal bodies 102, 104. The pedal axle 400 rotates about the central axis 201. The pedal bodies 102, 104 comprise an axle cavity 214 that is fashioned to receive the pedal axle 400 such that a first pedal body 102 and a second pedal body 104 can be mated with the pedal axle 400 resting in the axle cavities 214. In addition, the axle cavity 214 comprises an axle orifice 218. The axle orifice 218 provides a means for the inboard end 408 of the axle pedal 400 to exit the pedal bodies 102, 104. The pedal axle cavity 214 conforms substantially with the shape of the pedal axle 400 so as to minimize any radial or axial movement of the pedal bodies 102, 104 along the pedal axle 400.

The pedal axle may further comprise a dynamic seal 412, such as a lip seal at the axle orifice to prevent the entry of dirt and water into the axle cavity 214.

The pedal axle 400 comprises an inboard end 408 and an outboard end 402. The inboard end 408 can be attached to a crank arm. The outboard end 402 is fully contained within the pedal bodies 102, 104. As such, there is no need for an assembly access port on the pedal bodies 102, 104 near the outboard end 402. This will reduce the extent of any damage that may occur from impact of the pedal bodies 102, 104 on the end nearest the outboard end 402, and also simplifies manufacturing, as the typical open-ended outer cavity and its threaded end-cap have been eliminated.

In certain embodiments, the outboard end 402 further comprises a flange 404 to further reduce axial movement of the pedal bodies 102, 104 on the pedal axle 400. In such an embodiment, the pedal bodies 102, 104 further comprises a first axial positioning cavity 216 that conforms to the shape of the flange 404.

Figure 3:
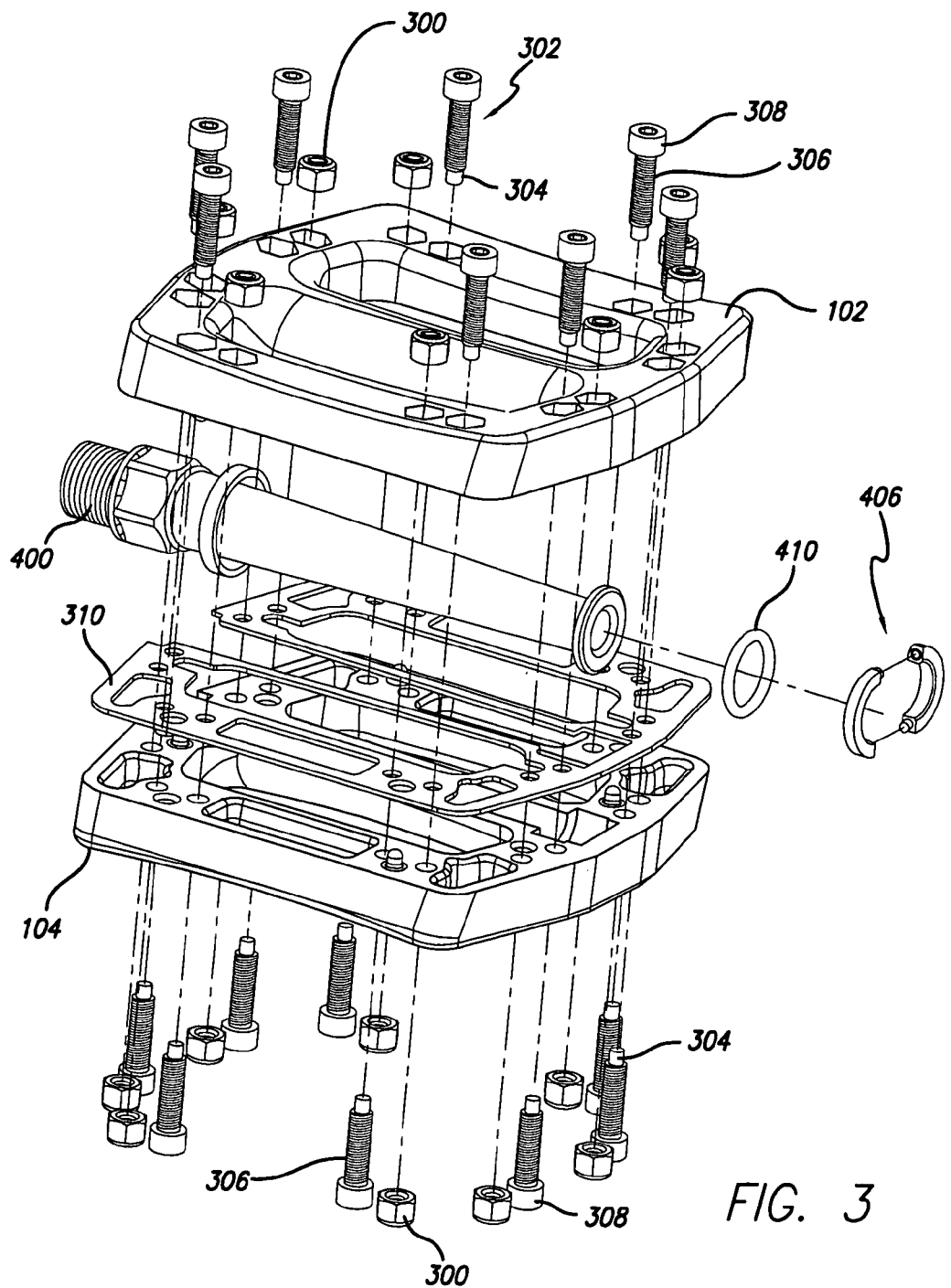
FIG. 3 is an exploded perspective detail of an embodiment of the present invention.
Figure 5:
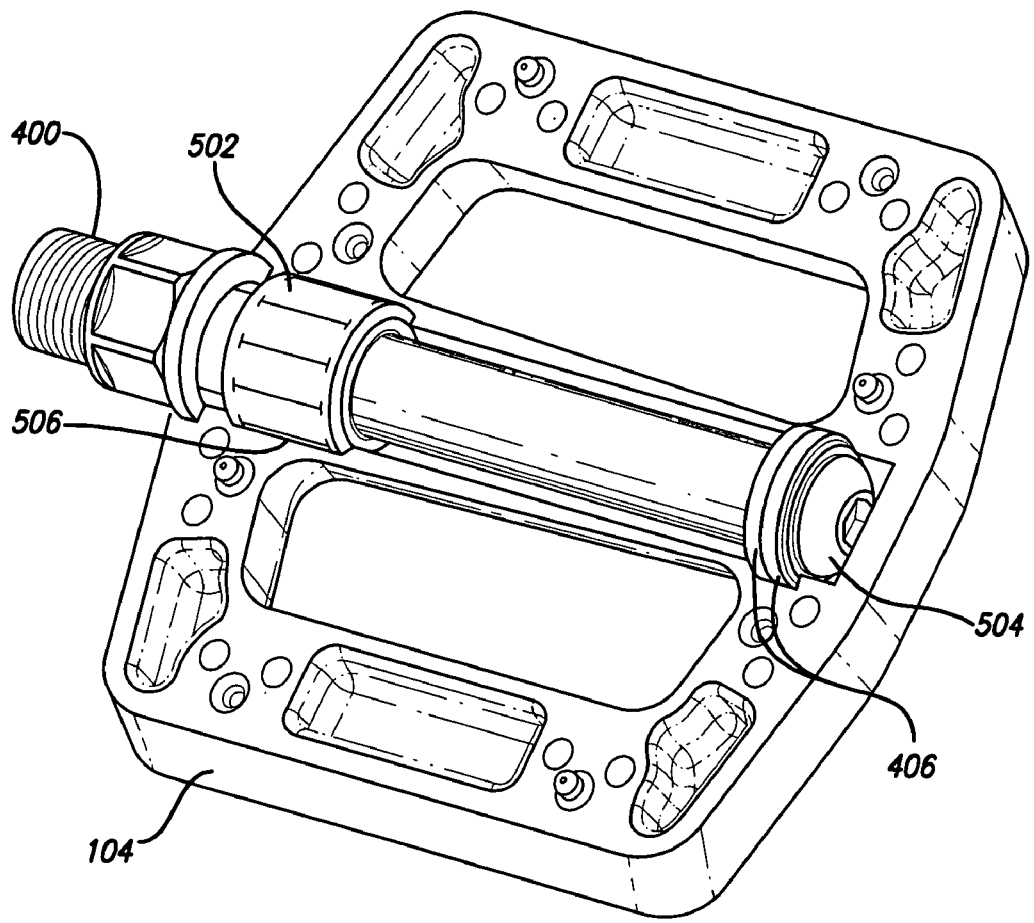
FIG. 5 is another embodiment of the inner surface of a pedal body with the axle shown.

In some embodiments, the pedal axle 400 may further include a bushing 406 and an o-ring 410. The o-ring 410 may be inserted into the first axial positioning cavity 216 in between the flange 404 and a first wall 220 or a second wall 222. The o-ring 410 increases the axial pressure exerted on the flange 404 towards the outboard end 402 of the pedal bodies 102, 104. That is, the o-ring 410 works in a spring-like fashion, forcing the pedal body's axle cavity 214 up the tapered section of the pedal axle 400, further reducing the potential for any unwanted radial movement. The pedal axle 400 may also fit a bushing 406. The bushing 406 provides added axial pressure against the walls 220, 222 of the first axial positioning cavity 216 and facilitates rotational movement of the pedal bodies 102, 104 about the pedal axle 400. In some embodiments, the bushing 406 may be constructed from two removable pieces as shown in FIG. 3. This allows the bushing 406 to be fitted onto a pedal axle utilizing a flange 404. In some embodiments, the bushing 406 may be one piece. For example, in embodiments utilizing a button-head bolt 504, as shown in FIG. 5, a one piece bushing can be slid onto the pedal axle 400 prior to the insertion of the button-head bolt 504.

The pedal axle 400 may be tapered towards the outboard end 402 leading up to the flange 404. In such an embodiment the axle cavity 214 would similarly be tapered. Addition of the o-ring 410 against the flange 404 would create a spring-like force that pushes the pedal axle 400 towards the outboard end 402. In other words, the tapered axle cavity 214 of the pedal body 102, 104 is effectively sprung into position along the corresponding tapered surface of the pedal axle 400. Because the axle cavity 214 is tapered, this spring-like action causes a thicker portion of the pedal axle 400 to move towards a narrower portion of the axle cavity 214, thereby increasing the pressure of the pedal axle 400 against the walls 220, 222 defining the axle cavity 214. This further reduces any axial movement, while also preventing any out-of-concentric radial wandering by the pedal body 102, 104. The fundamental concentric rotational movement of the pedal body 102, 104 about the pedal axle 400, remains functionally intact.

In another embodiment, the pedal axle 400 may incorporate a needle bearing 502 for high-capacity rotational loads. Preferably, in embodiments where the pedal bodies 102, 104 are constructed from a metal, the pedal axle 400 makes use of a bushing 406 and a needle bearing 502. Preferably, two bushing 406 are used. The pedal axle 400 may further comprise a button-head bolt 504 in lieu of the flange 404. The button-head bolt 504 has the advantage of being removable to allow for the assembly of the pedal axle's 400 hardware, namely the bushing 406, and the needle bearing 502. Furthermore, the button-head bolt 504 also allows the user to apply a precise amount of pre-load tensioning adjustment to the bushing 406 during tightening, effecting the rotational spin of the pedal. The button-head bolt 504 may be any type of bolt with a smooth rounded head that is slightly larger than the outboard end of the pedal axle 400.

In embodiments incorporating needle bearings 502, the pedal bodies 102, 104 may further comprise a second axial positioning cavity 506 to house the needle bearing 502. The bushing 406 may be housed in the first axial positioning cavity 216.

In one embodiment, the pedal body 102, 104 rotates directly on the pedal axle 400. In another embodiment, the pedal axle 400 can have bearings to facilitate the rotation of the pedal body about the pedal axle 400. Preferably, the pedal axle 400 comprises a roller bearing. The roller bearing may be a high-load capacity needle roller bearing 502 to bear all radial loads. The roller bearing can be positioned anywhere along the pedal axle 400. At the position of the roller bearing, the axle cavity 214 would have to be adjusted to accommodate the roller bearing. The pedal axle 400 can further comprise a thrust bearing, such as a bushing 406 or a cartridge ball bearing, preferably at the outboard end 402 of the pedal axle 400 adjacent to the flange 404. Cavities in the pedal body 102, 104 for the needle bearing 502 and the bushing 406 provide axial location and therefore help to absorb axial impacts. Furthermore, the axle's button-head bolt 504 provides rotational pre-load tension, in addition to preventing the axle 400 from being removed from the assembled body 102, 104. Utilizing two different structures to fix the axial movement and the radial movement enhances strength, performance, and durability.

The pedal axle 400 may be hollow. Using a hollow pedal axle 400 substantially reduces the weight and also increases its strength for a given material and heat-treatment.

Thus, a method is presented for providing traction on a pedal comprising the step of providing a pedal comprising a hole and a pedal surface, providing a bolt that can be inserted into the hole, and securing the bolt onto the pedal with a nut such that the bolt protrudes beyond the nut and the pedal surface so that the bolt resistively engages a footwear of a rider to provide traction for the rider. If the bolt becomes damaged or in some other way does not provide adequate traction, then traction can be restored by removing the damaged bolt and replacing the damaged bolt with an undamaged bolt. This provides an easy and cost-effective method for manufacturing a bicycle pedal that provides traction to its rider. It also provides a cost-effective method for replacing damaged traction mechanisms without having to replace the entire pedal.

Undoubtedly, numerous variations and modifications of the invention will become readily apparent to those familiar with bicycle pedal assemblies. Accordingly, the scope of the invention should not be construed as limited to the specific embodiments depicted and described, but rather is defined in the claims appended hereto.

INDUSTRIAL APPLICABILITY

This invention may be industrially applied to the development, manufacture, and use of bicycle pedals that allows a bicycle rider to easily replace the traction mechanisms, such as grip pins.

What is claimed is:

1. A bicycle pedal comprising:
 (a) a one-piece pedal axle comprising
  (i) an outboard end with an integrally formed flanged head,
  (ii) an inboard end opposite the outboard end,
  (iii) a roller bearing coupled to the inboard end, and
  (iv) a thrust bearing coupled to the outboard end;
  (v) an o-ring at the outboard end pressing the thrust bearing against the flanged head,
  (vi) wherein the pedal axle is hollow and tapers towards the outboard end
 (b) a first pedal body rotatably coupled directly to the pedal axle;
 (c) a second pedal body similar to the first pedal body and rotatably coupled directly to the pedal axle;
 (d) the first pedal body and the second pedal body each further comprising
  (i) an outer surface extending from the outboard end to the inboard end,
  (ii) an inner surface opposite the outer surface,
  (iii) a first cavity configured to receive the pedal axle, a second cavity configured to receive the roller bearing, and a third cavity configured to receive the integrally formed flanged head,
  (iv) a hole to receive a bolt, the bolt comprising a head, a shaft, and an exposed tail, the exposed tail having a length sufficient to protrude beyond the entire outer surface of the first or second pedal body;
  (v) a recess located on the outer surface, corresponding and leading in to the hole and configured to receive a hexagonal nut or the head of the bolt,
  (vi) an axle cavity located on the inner surface, journaled to receive the pedal axle,
  (vii) a locating peg positioned along the inner surface, and
  (viii) a locating aperture positioned along the inner surface, wherein the locating aperture of the first pedal body corresponds to and is configured to receive the locating peg of the second pedal body and the locating aperture of the second body corresponds to and is configured to receive the locating peg of the first pedal body such that mating of the locating peg with the locating aperture places the inner surface of the first pedal body in direct apposition with the inner surface of the second pedal body and a plurality of holes on the first pedal body are in direct alignment with a plurality of holes on the second pedal body, thereby allowing the tail of the bolt to penetrate through the first pedal body and exit and protrude out of the outer surface of the second pedal body with the head of the bolt lodged in the recess of the first pedal body.

2. A bicycle pedal, comprising:
 a. a first pedal body and a second pedal body, each comprising an outer surface, an inner surface opposite the outer surface, and a plurality of holes extending throughout each of the first and second pedal bodies from the outer surface to the inner surface, wherein the first pedal body and the second pedal body are mated together at the inner surface of the first pedal body and the inner surface of the second pedal body such that the hole of the first pedal body is aligned with the hole of the second pedal body;
 b. a plurality of bolts, each bolt comprising a head, an exposed tail, and a nut threaded to fit the bolt, wherein each bolt is insertable through one of the plurality of holes of the first pedal body and one of the plurality of holes of the second pedal body to securely fasten the first pedal body to the second pedal body with the nut, such that the exposed tails of the bolts protrude out above a majority of the outer surface of the first or second pedal body, thereby providing a traction mechanism; and
 c. a pedal axle comprising:
  i. an inboard end, and
  ii. an outboard end, wherein the pedal axle tapers towards the outboard end.

3. The bicycle pedal of claim 2 wherein the first pedal body and the second pedal body each further comprise a void to reduce the weight of the pedal body.

4. The bicycle pedal of claim 2 wherein the pedal axle further comprises a flanged head.

5. The bicycle pedal of claim 4 wherein the first and second pedal bodies each comprise an axle cavity conforming to the shape of the pedal axle to receive the pedal axle such that the first pedal body and the second pedal body when fastened together about the pedal axle can rotate about the pedal axle.

6. The bicycle pedal of claim 5 wherein the first pedal body and the second pedal body each further comprise a recess located on the outer surface, corresponding and leading in to the hole and configured to receive the nut such that the nut is completely lodged inside the recess and the nut is incapable of rotating within the recess.

7. The bicycle pedal of claim 6 wherein the first pedal body and the second pedal body each further comprise
   a. a locating peg positioned along the inner surface; and
   b. a locating aperture positioned along the inner surface;
   c. wherein the locating aperture of the first pedal body corresponds to and is configured to receive the locating peg of the second pedal body and the locating aperture of the second pedal body corresponds to and is configured to receive the locating peg of the first pedal body such that mating of the locating peg with the locating aperture places the inner surface of the first pedal body in direct apposition with the inner surface of the second pedal body and the hole in the first pedal body is in direct alignment with the hole in the second pedal body, thereby allowing the tail of the bolt to penetrate through the first pedal body and exit and protrude out of the outer surface of the second pedal body with the head of the bolt lodged in the recess of the first pedal body and the nut immovably lodged in the recess of the second pedal body.

8. The bicycle pedal of claim 5 wherein the pedal axle is hollow.

9. The bicycle pedal of claim 5 wherein the pedal axle further comprises an o-ring to compress the flanged head axially against the first and second pedal bodies, thereby reducing lateral and axial movement of the pedal axle within the first and second pedal bodies.

10. The bicycle pedal of claim 5 wherein the pedal axle further comprises
    a. a needle bearing on the inboard end of the pedal axle to fix the first and second pedal bodies axially while absorbing axial loads and
    b. a bushing on the outboard end to absorb radial loads.

* * * * *